(12) United States Patent
Hashimoto

(10) Patent No.: US 12,319,762 B2
(45) Date of Patent: Jun. 3, 2025

(54) OLEFIN-BASED RUBBER COMPOSITION

(71) Applicant: NOK CORPORATION, Tokyo (JP)

(72) Inventor: Kazuya Hashimoto, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 435 days.

(21) Appl. No.: 17/799,461

(22) PCT Filed: Jan. 26, 2021

(86) PCT No.: PCT/JP2021/002606
§ 371 (c)(1),
(2) Date: Aug. 12, 2022

(87) PCT Pub. No.: WO2021/161777
PCT Pub. Date: Aug. 19, 2021

(65) Prior Publication Data
US 2023/0070164 A1 Mar. 9, 2023

(30) Foreign Application Priority Data
Feb. 13, 2020 (JP) .................................. 2020-022722

(51) Int. Cl.
*C08K 3/26* (2006.01)
*C08F 210/18* (2006.01)
*C08K 5/14* (2006.01)

(52) U.S. Cl.
CPC .............. *C08F 210/18* (2013.01); *C08K 3/26* (2013.01); *C08K 5/14* (2013.01); *C08K 2003/267* (2013.01); *C08K 2201/001* (2013.01); *C08K 2201/005* (2013.01); *C08K 2201/014* (2013.01)

(58) Field of Classification Search
None
See application file for complete search history.

(56) References Cited

U.S. PATENT DOCUMENTS

| | | | |
|---|---|---|---|
| 6,340,530 B1 * | 1/2002 | Porter ..................... | C08K 3/01 264/172.19 |
| 2008/0200607 A1 * | 8/2008 | Ando ....................... | C09K 3/10 524/588 |
| 2014/0377539 A1 * | 12/2014 | Matsumoto ............. | C08L 63/00 428/323 |
| 2016/0096981 A1 | 4/2016 | Miyamoto | |
| 2017/0086303 A1 * | 3/2017 | Ham ........................ | B32B 38/10 |
| 2019/0352492 A1 * | 11/2019 | Xu ........................... | C08L 23/16 |
| 2019/0352493 A1 * | 11/2019 | Kim ......................... | C09D 7/80 |
| 2020/0131329 A1 * | 4/2020 | Nakamura ............... | C08F 14/06 |

FOREIGN PATENT DOCUMENTS

| | | | | |
|---|---|---|---|---|
| CN | 1043611936 A | * | 1/2015 | |
| JP | S61-213247 | | 9/1986 | |
| JP | 2006-291078 | | 10/2006 | |
| JP | 2012-126047 A | * | 12/2010 | |
| JP | 2012-126047 | | 7/2012 | |
| JP | 2014-214189 | | 11/2014 | |
| JP | 2015-189781 A | | 11/2015 | |
| KR | 102115970 B1 | * | 5/2020 | |
| WO | WO-2019197520 A1 | * | 10/2019 | ......... A41D 19/0055 |

OTHER PUBLICATIONS

ISR issued in International Patent Application No. PCT/JP2021/002606, Apr. 13, 2021, translation.
IPRP issued in International Patent Application No. PCT/JP2021/002606, Aug. 11, 2022, translation.
Office Action issued in Chinese Patent Application No. 202180011489.0, Aug. 21, 2023, translation.
Zhou Anning et al., "Introduction to Carbon Chemistry Industry", China University of Mining and Technology Press, 1st Edition, Sep. 2017, p. 193, translation.

* cited by examiner

*Primary Examiner* — Katarzyna I Kolb
(74) *Attorney, Agent, or Firm* — GREENBLUM & BERNSTEIN, P.L.C.

(57) ABSTRACT

Provided is an olefin-based rubber composition having low hardness, good thermal conductivity, and good electrical insulation, and applying little load on a manufacturing facility. The olefin-based rubber composition of the present disclosure contains an ethylene-α-olefin-nonconjugated polyene copolymer, at least two types of magnesium carbonate which are small-particle size magnesium carbonate with 0.3 to 5 μm of an average particle size and large-particle size magnesium carbonate with 7-60 μm of an average particle size, and a cross-linking agent, wherein the composition contains 400 to 1200 parts by mass of a total content of the two types of magnesium carbonate per 100 parts by mass of the ethylene-α-olefin-nonconjugated polyene copolymer, Shore A hardness conforming to JIS K 6253-3:2012 of the olefin-based rubber composition after cross-linking is 80, and thermal conductivity conforming to ASTM D7984 of the olefin-based rubber composition after cross-linking is 2.0 W/m·K or more.

4 Claims, No Drawings

OLEFIN-BASED RUBBER COMPOSITION

TECHNICAL FIELD

The present invention relates to an olefin-based rubber composition.

BACKGROUND ART

Thermal conductive rubbers are used for sealing materials for semiconductor chips or the like, heat dissipation materials for circuit substrates, or the like. Further, since these materials require electrical insulation in addition to thermal conductivity, selecting fillers to be compounded into a rubber is very important.

In order to give thermal conductivity to a rubber, thermal conductive fillers, such as aluminum oxide, graphite, beryllium oxide, zinc oxide, magnesium oxide, boron nitride, aluminum nitride and the like, have been compounded into the rubber conventionally.

Nitrides such as aluminum nitride and boron nitride have good thermal conductivity. On the other hand, they are expensive. Especially aluminum nitride is an unstable hydrolytic material and difficult to handle. Aluminum oxide is chemically stable, and its thermal conductivity is relatively good. However, aluminum oxide has a very high Mohs hardness of 9 and a load on a manufacturing facility using iron or the like with Mohs hardness lower than that is concerned. Thermal conductivity of magnesium oxide is better among oxides. However, magnesium oxide has the nature of absorbing moisture, resulting in exhibiting stable performances being difficult. Further, although various methods for treating surfaces are being examined, no sufficient method has been found yet. Beryllium oxide has good thermal conductivity, however, it is expensive. Since beryllium oxide is categorized into the class I specified chemical substance, care is required to handle it. Silica is widely used as a filler for sealing materials, however, its thermal conductivity is insufficient.

As an alternative filler, Patent Document 1 discloses an anhydrous magnesium carbonate filler for compounding into a synthetic resin and a synthetic rubber, in which the anhydrous magnesium carbonate filler is composed of anhydrous magnesium carbonate with 0.1-10 $m^2/g$ of the BET specific surface area and 1-50 µm of the average particle size.

PRIOR ART DOCUMENT

Patent Document

Patent Document 1: Japanese Unexamined Patent Application Publication No. 2006-291078

SUMMARY

Problems to be Solved

Patent Document 1 discloses that magnesium carbonate may provide thermal conductivity, fire retardancy, processability or the like. However, a possibility for providing electrical insulation is unclear and needs for improving thermal conductivity and hardness remain.

The present disclosure has been developed in view of the above circumstances. Namely, an object of the present disclosure is to provide an olefin-based rubber composition which has lower hardness for a rubber composition, excellent thermal conductivity and electrical insulation, and less load on a manufacturing facility.

Solution to Problems

The present inventor focused on magnesium carbonate as a filler for an olefin-based rubber to solve the problems mentioned above. In addition, by using magnesium carbonate with different particle sizes together, the present inventor successfully obtained an olefin-based rubber composition having a good physical property balance, and arrived at the present disclosure. Namely, the present disclosure has a configuration described below.

An olefin-based rubber composition contains: an ethylene-α-olefin-nonconjugated polyene copolymer; at least two types of magnesium carbonate; and a cross-linking agent; in which one of the two types of magnesium carbonate is small-particle-size magnesium carbonate having 0.3-5 µm of an average particle size, and another one of the two types of magnesium carbonate is large-particle-size magnesium carbonate having 7-60 µm of an average particle size; a total content of the two types of magnesium carbonate relative to 100 parts by mass of an ethylene-α-olefin-nonconjugated polyene copolymer is 400-1200 parts by mass; a Shore A (durometer A) hardness conforming to JIS K 6253-3:2012 of the olefin-based rubber composition after cross-linking is 80; and thermal conductivity conforming to ASTM D7984 of the olefin-based rubber composition after cross-linking is 2.0 W/m·K and more.

Advantageous Effects of the Disclosure

An olefin-based rubber composition of the present disclosure has low hardness, good thermal conductivity, good electrical insulation, and less load on a manufacturing facility.

DETAILED DESCRIPTION OF EMBODIMENTS

Hereinafter, embodiments of the present invention will be described in detail. However, the scope of the present invention is not limited to those embodiments shown as examples described below.

An olefin-based rubber composition of the present embodiment is a rubber composition containing an ethylene-α-olefin-nonconjugated polyene copolymer, magnesium carbonate or the like. Each of the components composing the olefin-based rubber composition will be described below.

(Ethylene-α-olefin-nonconjugated polyene copolymer)
The present inventor employed an ethylene-α-olefin-nonconjugated polyene copolymer as a base polymer (base rubber) of a rubber composition.

The ethylene-α-olefin-nonconjugated polyene copolymer is excellent in heat resistance, cold resistance, weather resistance, durability, rebound resilience, processability, ozone resistance, chemical resistance, electrical properties, or the like, and has low hardness, resulting in being suitable for an application of a sealing material, a heat dissipation material, or the like.

As α-olefins, specifically, propylene, 1-butene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyl-1-decene, 11-methyl-1-dodecene, 12-ethyl-1-tetradecene, or the like are given. Among these, α-olefins having 3-10 carbons are preferable, propylene, 1-butene, 1-hexene, 1-octene are more preferable, and propylene is the most preferable. These α-olefins may be used alone or in a combination of more than one kind of α-olefins.

As a representative ethylene-α-olefin-nonconjugated polyene copolymer, an ethylene-propylene-nonconjugated polyene copolymer (herein after it may be described as EPDM rubber) is given. In an EPDM rubber, a propylene content relative to the total content of the ethylene and propylene in EPDM rubber is preferably 15-50 mol % and more preferably 30-50 mol %. Hereinafter, EPDM rubber is explained as an example.

As a nonconjugated polyene in an EPDM rubber, nonconjugated linear dienes, nonconjugated cyclic dienes, and trienes are given. As a nonconjugated linear diene, 1,4-hexadiene, 3-methyl-1,4-hexadiene, 4-methyl-1,4-hexadiene, 5-methyl-1,4-hexadiene, 4,5-dimethyl-1,4-hexadiene, 7-methyl-1,6-octadiene, or the like are given. As a nonconjugated cyclic diene, methyltetrahydroindene, 5-vinyl-2-norbornene, 5-ethylidene-2-norbornene, 5-methylene-2-norbornene, 5-isopropylidene-2-norbornene, 5-vinylidene-2-norbornene, 6-chlolomethyl-5-isopropenyl-2-norbornene, dicyclopentadiene, or the like are given. As a triene, 2,3-diisopropylidene-5-norbornene, 2-ethylidene-3-isopropylidene-5-norbornene, 2-propenyl-2,2-norbornadiene, or the like are given. Although the nonconjugated polyene is not limited specifically, nonconjugated dienes are preferable. Among nonconjugated dienes, 5-ethylidene-2-norbornene (ENB), dicyclopentadiene (DCPD) and 1,4-hexadiene (HD) are particularly preferable. The iodine value of an EPDM rubber is preferably in a range of 0.5 to 50.

The Mooney viscosity $ML_{1+4}$ (100° C.) of an EPDM rubber is preferably in a range of 10 to 300, and more preferably 20 to 150. Both a non-oil extended rubber and an oil extended rubber may be used as an EPDM rubber. As oil of the oil extended rubber, generally, paraffin-based oil is used.

Magnesium carbonate is a carbonate of magnesium, and is a stable compound having water resistance. As forms of magnesium carbonate, anhydrides, dihydrates, trihydrates and pentahydrates exist. Further, magnesium carbonate is a tasteless odorless white powder, and various particle sizes of the powders may be produced. Besides, the Mohs hardness of magnesium carbonate is 3.5, resulting in less load being applied on a manufacturing facility using iron or the like with 5 of Mohs hardness.

The present inventor focused on magnesium carbonate having excellent thermal conductivity in addition to the excellent basic properties described above, and examined the potential of magnesium carbonate as a filler to provide thermal conductivity to a rubber composition.

The thermal conductivity of a rubber composition increases by adding a fine particle of magnesium carbonate to the rubber composition. However, increase of compounding amount of magnesium carbonate makes hardness of the rubber composition higher, thereby making it difficult for the rubber composition to be applied for a use of a sealing material, a heat dissipation material or the like. Therefore, the present inventor examined a combinational use of fine particles of magnesium carbonate having different particle sizes.

The present inventor examined adding at least two types of magnesium carbonate, each of which has a different average particle size, to an EPDM rubber, and found out that adding at least two kinds of magnesium carbonate achieved a rubber composition of a lower hardness having a stable property without hydrolysis and moisture absorption and thermal conductivity and electrical insulation together.

When different types of fine particles of magnesium carbonate, each of which has a different particle size, are used together, fine particles having smaller particle sizes are filled in gap spaces between fine particles having larger particle sizes. As a result, by comparing addition of only magnesium carbonate having larger particle sizes or addition of magnesium carbonate having smaller particle sizes, an increase of hardness of a rubber composition was prevented, which allowed the rubber composition to be in good balance with both thermal conductivity and electrical insulation.

An average particle size of magnesium carbonate having smaller particle sizes is 0.3 to 5 μm, preferably 0.5 to 4 μm, and more preferably 0.7 to 3 μm. On the other hand, an average particle size of magnesium carbonate having larger particle sizes is 7 to 60 μm, preferably 10 to 50 μm, and more preferably 15 to 40 μm. The average particle sizes of magnesium carbonate may be measured by conforming to JIS Z8825:2013.

Further, in the present embodiment, as long as not inhibiting the effects of the present disclosure, magnesium carbonate having an average particle size which is different from the average particle sizes of the smaller particles and larger particles may be used together, other than the small-particle-size magnesium carbonate having 0.3 to 5 μm of an average particle size and the large-particle-size magnesium carbonate having 7 to 60 μm of an average particle size.

Here, magnesium carbonate having an average particle size of 0.3 to 5 μm may be described as "small-particle-size magnesium carbonate", and magnesium carbonate having an average particle size of 7 to 60 μm may be described as "large-particle-size magnesium carbonate".

Considering a balance among each property, i.e. hardness, thermal conductivity, and electrical insulation, of a rubber composition, a mass ratio of small-particle-size magnesium carbonate to large-particle-size magnesium carbonate is 20/80 to 80/20, preferably 30/70 to 70/30, and more preferably 40/60 to 60/40.

To achieve a balance among each property, i.e. hardness, thermal conductivity and electrical insulation, of a rubber composition, a total content (compounding amount) of said two types of magnesium carbonate relative to an EPDM rubber is 400 to 1200 parts by mass, preferably 500 to 1200 parts by mass, more preferably 600 to 1100 parts by mass, per 100 parts by mass of an EPDM rubber.

Cross-Linking Agent

Organic peroxides or sulfur may be used as a cross-linking agent for an EPDM rubber. In the application in which heat resistance and compression set are considered to be important, using organic peroxides is preferable.

As organic peroxides, known organic peroxides may be used. As organic peroxides, for example, dicumyl peroxide, t-butyl cumyl peroxide, 2,5-dimethyl-2,5-di(t-butylperoxy)hexane, α,α'-di(t-butylperoxy)diisopropylbenzene, 2,5-dimethyl-2,5-bis(t-butylperoxy)hexyne, 1,1-di(t-hexylperoxy)cyclohexane, 1,1-di(t-butylperoxy)cyclohexane, 2,5-dimethyl-2,5-di(benzoylperoxy)hexyne, t-hexylperoxy benzoate and t-butylperoxy benzoate are given. Compounding 1 to 3 parts by mass of organic peroxides to 100 parts by mass of EPDM polymer is preferable. The compounding amount of organic peroxides relative to 100 parts by mass of the EPDM polymer is preferably 1 to 2.75 parts by mass, and further preferably 1.0 to 2.5 parts by mass. When the compounding amount of organic peroxides is below 1 part by mass, a decrease of compression set is concerned. When the compounding amount of the organic peroxides is over 3 parts by mass, a decrease of durability is concerned.

Sulfur is compounded to 100 parts by mass of an EPDM rubber at 0.1 to 0.8 parts by mass. The compounding amount of sulfur relative to 100 parts by mass of an EPDM rubber is preferably 0.1 to 0.6 parts by mass, and more preferably 0.1 to 0.4 parts by mass. When the compounding amount of sulfur is below 0.1 parts by mass, the improving effect of durability is small. When the compounding amount of sulfur is over 0.8 parts by mass, a decrease of blooming and heat resistance (compression set) is concerned.

Olefin-Based Rubber Composition

An olefin-based rubber composition of the present embodiment may contain a rubber other than an EPDM rubber as long as the effect of disclosure is not inhibited. Further, various types of known additives may be optionally added to an olefin-based rubber composition of the present embodiment. As known additives, reinforcing materials, inorganic fillers, plasticizers, softeners, age resisters, processing aids, cross-linking co-agents, cross-linking promoters, dispersing co-agents, blowing agents, blowing promoters, coloring agents, flame retardants, tackifiers, and mold releasing agents, or the like are given.

The Shore A (Durometer A) hardness conforming to JIS K 6253-3:2012 of an olefin-based rubber composition after cross-linking is 80 or below. When the Shore A hardness of an olefin-based rubber composition is over 80, it is difficult to use the olefin-based rubber composition for a wide range of applications as a sealing material or a heat dissipation material of an electronic device or the like.

The thermal conductivity of an olefin-based rubber composition after cross-linking is 2.0 W/m·K and more, and 2.2 W/m·K or more is preferable. To provide such a high level of thermal conductivity to an olefin-based rubber composition, adding a large amount of magnesium carbonate is needed as mentioned above. The thermal conductivity may be measured by conforming to ASTM D7984.

The electrical resistivity of an olefin-based rubber composition after cross-linking is $1 \times 10^{10}$ Ω·cm and more. When the electrical resistivity after cross-linking is below $1 \times 10^{10}$ Ω·cm, it is difficult to use the olefin-based rubber composition for a wide range of application as a sealing material or a heat dissipation material of an electronic device or the like. The electrical resistivity may be measured by conforming to JIS K 6271-1:2015.

The tensile strength of an olefin-based rubber composition after cross-linking is preferably 1.0 MPa or more, and 1.5 MPa and more is more preferable. Further, the elongation (elongation at break) of an olefin-based rubber composition is preferably 100% or more, and 150% or more is more preferable. The tensile strength and the elongation may be measured by conforming to JIS K 6251.

Producing Method

To produce a molded product by using an olefin-based rubber composition of the present embodiment, at first, an uncross-linked olefin-based rubber composition is prepared. As known production equipment for an uncross-linked olefin-based rubber composition, for example, a Banbury mixer, a kneader, a planetary mixer, an intermix, a two rolls, a three rolls, or the like are given. After mixing predetermined raw materials and preparing an uncross-linked olefin-based rubber composition, a first cross-linking is performed by heating at about 150 to 200° C. for about 3 to 60 minutes, generally by using a cross-linking press machine, a compression molding device, and an injection molding device. If it is needed, a second cross-linking may be performed by oven-heating or the like at about 120 to 200° C. for about 1 to 24 hours. By the above-mentioned cross-linking, a cross-linked molded product of an olefin-based rubber composition may be obtained.

An olefin-based rubber composition of the present embodiment has low hardness, good thermal conductivity, and good electrical insulation, thereby it is suitably used as a sealing material for a semiconductor chip being loaded on an electronics, an automobile, a general industrial machinery, or the like, and as a heat dissipation material for a circuit substrate for an electronics, an automobile, a general industrial machinery, or the like.

EXAMPLE

Hereinafter, the present disclosure will be described by referring to Examples. However, the present disclosure is not limited to those Examples.

Examples 1 to 3, Comparative Examples 1 to 7

The raw materials used in Examples are given below.

(i) EPDM rubber: oil extended EPDM, LANXESS AG, KELTAN 5469C, oil content 100 phr;

(ii) Cross-linking agent: dicumyl peroxide, NOF Corporation, PERCUMYL® D;

(iii) Dispersing co-agent: stearic acid, MIYOSHI OIL & FAT CO., LTD., DTST;

(iv) Reinforcing agent: graphite, Chuetsu Graphite Works Co., Ltd., G-6S;

(v) Filler: zinc oxide, SEIDO CHEMICAL INDUSTRY CO., LTD.; and (vi) Magnesium carbonate: Konoshima Chemical Co., Ltd., MAGTHERMO® MS-PS (Average particle size: 21.0 μm), MAGTHERMO® MS-S (Average particle size: 1.2 μm)

Production of Test Pieces for Measuring Properties

Uncross-linked rubber sheets of the rubber compositions described in Table 1 were prepared by mixing the raw materials together by using a 3 (L) kneader and a 12-inch open roll. Then, the uncross-linked rubber sheets were cross-linked at 180° C. of the first cross-linking temperature for 6 minutes of cross-linking time, and cross-linked rubber sheets with 2 mm thickness were formed.

Evaluation Items

Physical Properties Under a Normal State

For cross-linked rubber sheets, physical properties under a normal state described below were evaluated.

Hardness: Measured by using a type A durometer by conforming to JIS K 6253-3:2012;

Tensile strength (MPa): Measured by conforming to JIS K 6251; and

Elongation (%): Measured by conforming to JIS K 6251.

Thermal Conductivity

For cross-linked rubber sheets, thermal conductivity was evaluated.
Thermal conductivity (W/m·K): Measured by conforming to ASTM D7984.

Electrical Resistivity

For cross-linked rubber sheets, electrical resistivity was evaluated.
Electrical resistivity (Ω·cm): Measured by conforming to JIS K 6271-1:2015.

Evaluation results are shown in Table 1. In the column of Electrical resistivity in Table 1, for example, 1.54*10^13 Ω·cm means $1.54 \times 10^{13}$ Ω·cm. The same applies below.

| Item | Component | | Comparative Example 1 | Comparative Example 2 | Comparative Example 3 | Comparative Example 4 | Example 1 |
|---|---|---|---|---|---|---|---|
| Composition EPDM rubber | KELTAN 5469C (oil extended 100 phr) | Parts by Mass | 200 | 200 | 200 | 200 | 200 |
| Cross-linking agent | Dicumyl peroxide | Parts by Mass | 3 | 3 | 3 | 3 | 3 |
| Dispersing co-agent | Stearic acid | Parts by Mass | 2 | 2 | 2 | 2 | 2 |
| Reinforcing agent | Graphite 6-GS | Parts by Mass | 40 | 40 | 40 | 40 | 40 |
| Cross-linking promoter | Zinc oxide | Parts by Mass | 200 | 200 | 200 | 200 | 200 |
| Magnesium carbonate | MS-PS (average particle size: 21 μm) | Parts by Mass | 200 | 600 | — | 300 | 400 |
| | MS-S (average particle size: 1.2 μm) | Parts by Mass | 200 | — | 600 | 300 | 300 |
| | Total amount of magnesium carbonate | Parts by Mass | 400 | 600 | 600 | 600 | 700 |
| Properties Hardness | Shore Hardnss, type A durometer, JIS K 6253-3:2012 | | 56 | 65 | 74 | 68 | 75 |
| Tensile strength | Complying with JIS K 6251 | Mpa | 2.86 | 2.49 | 2.01 | 1.83 | 1.9 |
| Elongation | Complying with JIS K 6251 | % | 700 | 560 | 510 | 530 | 470 |
| Thermal conductivity | Complying with ASTM D7984 | W/m·K | 1.16 | 1.68 | 1.9 | 1.84 | 2.01 |
| Electrical resistivity | Complying with JIS K 6271-1 | Ω·cm | 1.54*10^13 | 2.66*10^11 | 1.845*10^11 | 5.48*10^10 | 2.75*10^10 |

| Item | Component | | Example 2 | Example 3 | Comparative Example 5 | Comparative Example 6 | Comparative Example 7 |
|---|---|---|---|---|---|---|---|
| Composition EPDM rubber | KELTAN 5469 C (oil extended 100 phr) | | 200 | 200 | 200 | 200 | 200 |
| Cross-linking agent | Dicumyl peroxide | | 3 | 3 | 3 | 3 | 3 |
| Dispersing co-agent | Stearic acid | | 2 | 2 | 2 | 2 | 2 |
| Reinforcing agent | Graphite 6-GS | | 40 | 40 | 40 | 40 | 40 |
| Cross-linking promoter | Zinc oxide | | 200 | 200 | 200 | 200 | 200 |
| Magnesium carbonate | MS-PS (average particle size: 21 μm) | | 400 | 400 | 500 | 500 | 600 |

-continued

| | | | | | | | |
|---|---|---|---|---|---|---|---|
| | | MS-S (average particle size: 1.2 μm) | 400 | 500 | 500 | 600 | 600 |
| | | Total amount of magnesium carbonate | 800 | 900 | 1000 | 1100 | 1200 |
| Properties | Hardness | Shore Hardnss, type A durometer, JIS K 6253-3:2012 | 78 | 79 | 85 | 86 | 91 |
| | Tensile strength | Complying with JIS K 6251 | 1.55 | 2.06 | 1.98 | 2.28 | 2.57 |
| | Elongation | Complying with JIS K 6251 | 480 | 170 | 160 | 50 | 20 |
| | Thermal conductivity | Complying with ASTM D7984 | 2.2 | 2.25 | 2.45 | 2.49 | 2.61 |
| | Electrical resistivity | Complying with JIS K 6271-1 | $4.17*10^{10}$ | $3.24*10^{10}$ | $1.98*10^{10}$ | $1.2*10^{10}$ | $2.25*10^{10}$ |

As indicated in the results of Table 1, olefin-based rubber compositions of Examples 1 to 3 have 80 or below of Shore (durometer) hardness, 1.5 MPa or more of tensile strength, 150% or more of elongation, 2.0 W/m·K or more of thermal conductivity, and $1\times10^{10}$ Ω·cm and more of electrical resistivity, and have each of properties in good balance. By contrast, olefin-based rubber compositions of Comparative Examples 1 to 4 have below 2.0 W/m·K of thermal conductivity, resulting in having poor thermal conductivity. Further, olefin-based rubber compositions of Comparative Examples 5 to 7 have over 80 of Shore (durometer) hardness, resulting in having higher hardness. Furthermore, olefin-based rubber compositions of Comparative Examples 6 to 7 have below 100% of elongation, resulting in having poor elongation properties.

What is claimed is:

1. An olefin-based rubber composition comprising:
    an ethylene-α-olefin-nonconjugated polyene copolymer;
    at least two types of magnesium carbonate; and
    a cross-linking agent,
    wherein
    one of the two types of magnesium carbonate is small-particle-size magnesium carbonate having 0.3 to 5 μm of an average particle size, and the other one of the two types of magnesium carbonate is large-particle-size magnesium carbonate having 7 to 60 μm of average particle size, and a parts by mass ratio of the small-particle-size magnesium carbonate to the large-particle-size magnesium carbonate is 25/80 to 80/20;
    a total content of the two types of magnesium carbonate relative to 100 parts by mass of the ethylene-α-olefin-nonconjugated polyene copolymer is 400 to 1200 parts by mass; and
    the olefin-based rubber composition after cross-linking has:
        a Shore A hardness of 80 or less which id measured in compliance with JIS K 6253-3:2012 by using Durometer type A; and
        a thermal conductivity of 2.0 W/m·K or more which is measured incompliance with ASTM D7984.

2. The olefin-based rubber composition of claim 1, wherein an electrical resistivity of the olefin-based rubber composition after cross-linking has an electrical resistivity of $1\times10^{10}$ Ω·cm or more which is measured in compliance with JIS K 6271-1:2015.

3. The olefin-based rubber composition of claim 1, wherein the olefin-based rubber composition is used for a sealing material or heat dissipation material.

4. The olefin-based rubber composition of claim 2, wherein the olefin-based rubber composition is used for a sealing material or heat dissipation material.

* * * * *